United States Patent [19]
Cook

[11] 3,766,477
[45] Oct. 16, 1973

[54] SPREAD SPECTRUM, LINEAR FM COMMUNICATIONS SYSTEM

[75] Inventor: Charles E. Cook, Carlisle, Mass.

[73] Assignee: Sperry Rand Corporation, New York, N.Y.

[22] Filed: Dec. 20, 1971

[21] Appl. No.: 209,985

[52] U.S. Cl. .................... 325/30, 325/47, 325/145, 325/344, 343/17.2 PC

[51] Int. Cl. .................... H04l 27/10

[58] Field of Search .................... 325/30, 45, 47, 145, 325/163, 320, 344; 329/110, 112; 332/16 R; 343/17.1 R, 17.1 PF, 17.2 R, 17.2 PC

[56] References Cited

UNITED STATES PATENTS

| | | | |
|---|---|---|---|
| 3,281,842 | 10/1966 | Cerar et al. | 343/17.2 PC |
| 3,299,427 | 1/1967 | Kondo | 343/17.2 PC UX |
| 3,271,768 | 9/1966 | Larky | 343/17.1 R |

*Primary Examiner*—Malcolm A. Morrison
*Assistant Examiner*—R. Stephen Dildine, Jr.
*Attorney*—H. P. Terry

[57] ABSTRACT

A pulse compression system comprising a transmitter which provides a maximum number of output signals from a class of linear waveforms in which the number that may be used is a function of the desired cross-talk performance which depends on the signal time-bandwidth product and the FM slope differences between the signals. The transmitter includes a plurality of linear FM generators and associated modulation oscillators to provide the number of different signals desired. A receiver responsive to the number of different transmitted signals includes a corresponding number of mixers and local oscillators coupled to pulse compression filter means having optimum response characteristics matched to the number of signals that are transmitted thereby enabling a significant increase in the number of signals which may be transmitted and received by the disclosed communications system.

11 Claims, 13 Drawing Figures

PROCESSOR USED IN 21a THRU 21p IF FM MISMATCH IS PRODUCED BY VARYING SIGNAL PULSE DURATION.

PROCESSOR USED IN 21a THRU 21p IF FM MISMATCH IS PRODUCED BY VARYING LINEAR FM BANDWIDTH.

SPREAD SPECTRUM, LINEAR FM COMMUNICATIONS SYSTEM

BACKGROUND OF THE INVENTION

1. Field of the Invention

The present invention relates generally to pulse coded communications systems and specifically to a system which utilizes linear FM signalling capability having a number of degrees of freedom on the same order as other forms of spread spectrum signaling such as frequency hop signals and pseudonoise signals.

2. Description of the Prior Art

It is known in the prior art that a class of spread spectrum signals may be used as address selectable carrier signals in order to fit many potential users into a limited bandwidth channel in which only a few users will be operating at any one time. Each processor operating within the limited bandwidth channel is optimized or tuned to a particular signal as determined by the signal characteristics. When only one signal is being transmitted the receiver having the processor tuned to that particular signal will provide an optimum output. All other receivers operating within the limited bandwidth channel will have a low level noise like output signal.

As more signals within the limited bandwidth channel are transmitted, the first receiver attempts to maintain an optimum output in response to its particular signal. However, all the other signals now being transmitted tend to increase the noise level. As the number of transmitted signals increases, the noise-like interference in each receiver becomes so large that the receiver cannot maintain its capability to detect its own optimum output response. Therefore, in order to provide useable signal transmissions only a limited number of users will be operating at any one time.

The class of linear FM signals is an example of a spread spectrum signal set that can be considered for use in a communication system. The number of linear FM signals that can be used within the constraints of a bounded time-frequency region while meeting specified criteria for low mutual interference or cross-talk has previously been assumed to be primarily a function of the difference in the slopes of the linear FM signals. The subject invention teaches that this is only one of the factors to be considered in determining the maximum number of signals that may be used and further discloses a system for providing the maximum number of signals that can be used within the constraints of a time-frequency region while meeting the criteria for low mutual interference or cross-talk.

SUMMARY OF THE INVENTION

The subject invention describes an apparatus for providing a total number of linear FM signals within a bounded time-frequency region which meet a specific cross-talk requirement in a communication system. Operation in a non-synchronous mode provides the smallest total number of signals while operating in a synchronized mode provides an increased number of signals and operation in a synchronized mode using complex FM signals provides a maximum number of useful signals.

In the non-synchronous mode, the communication system provides a total number of linear FM signals having both positive and negative slopes for a specific cross-talk requirement, $R^2$, and time bandwidth product, $T_oW_o$, by providing signals having FM slopes which fall between the angle $\alpha_N$ which defines the minimum and maximum FM slopes that will meet the established conditions.

The system includes signal generators which provide a number of linear FM slope mismatch factors,$\gamma$, by including modulators for varying linear FM bandwidth for equal duration pulses or varying the pulse duration for equal linear FM bandwidths. Alternatively a combination which includes modulators for varying the bandwidth and modulators for varying the pulse duration of the linear FM signals may be used. The plurality of linear FM modulators which provide the maximum number of signals having differing FM slopes are included in an otherwise conventional communication transmitter. The receiver includes a conventional mixer and local oscillator for heterodyning the received signals which are then processed in a plurality of processors in a pulse compression filter which act upon the received linear FM signals to obtain compressed pulses corresponding to the signals having differing FM slopes.

In the synchronized mode, the number of signals is increased by transmitting a first short duration low time-bandwidth synchronizing signal. Then making use of the same large time-bandwidth fixed FM slope, as in the non-synchronous mode, the center frequency of subsequent transmitted signals is shifted so that the output signals are moved back and forth in time thereby occupying different time slots. As a result, sufficient frequency shifts are provided so that the number of time slots available becomes a sizable fraction of the signal time-bandwidth product. The apparatus for use with linear FM signals in a synchronized mode is similar to that used in a non-synchronized mode except that it includes additional circuitry in a synchronizing channel to provide synchronization with the transmitted signals.

The maximum number of signals transmitted in a limited time-frequency range is obtained by using complex linear FM signals in a synchronized mode. This technique includes additional sinusoidal FM modulation added to the linear FM signal which produces paired sideband signals that provide well-correlated signals at the linear FM signal processor output. The processor output signals are time displaced about a central position because of the frequency shift associated with each sideband signal. The apparatus required for this technique is similar to that used in the synchronized mode with the addition of an oscillator and summing circuit associated with each linear sweep generator in the transmitter section of a communication system. Further, additional stages in the receiver processor pulse compression filter section are also required.

As disclosed herein, the apparatus taught for using linear FM signals in the non-synchronous or synchronous mode provides a maximum range of signals in a limited time-frequency region.

DESCRIPTION OF THE PREFERRED EMBODIMENT

Figure 1:
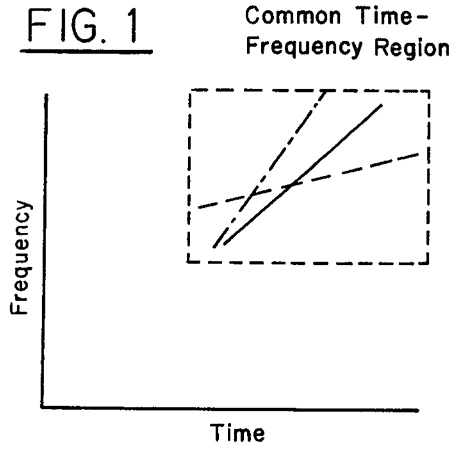
FIG. 1 is a graphical representation of a plurality of signals occupying a common time-frequency region.
Figure 2:
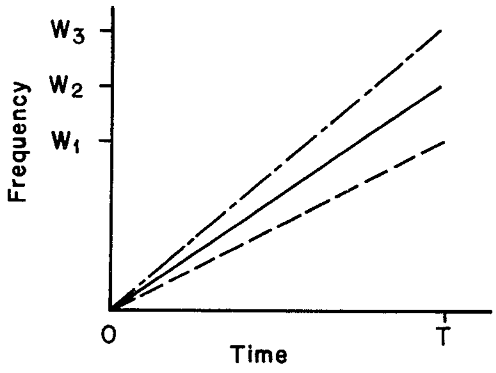
FIG. 2 is a graph of a plurality of signals having different FM slopes obtained by varying the linear FM bandwidth of the signals.
Figure 3:
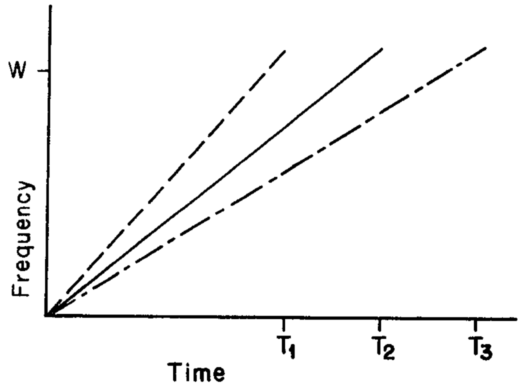
FIG. 3 is a graph of signals having different FM slopes obtained by varying the signal duration of each signal.

In the pulse compression art, it is understood that a frequency swept carrier signal of relatively low amplitude and long duration may be compressed into a predominant single pulse of relatively high amplitude and short duration by a pulse compression filter. In a linear FM communication system, the ratio of the signal bandwidth, W, of the sweep slope, to the pulse duration, T, has a linear slopt, $\mu$, that may be either positive or negative, as shown in FIG. 1. Further, the FM slopes may be mismatched by varying the linear FM bandwidth for pulses of equal duration as represented in FIG. 2 or by varying the pulse duration for equal FM bandwidths as represented in FIG. 3. As a result, for constant FM positive and negative slopes, two signals may be transmitted in the same time-frequency region. Mismatching the FM slopes by varying the linear FM bandwidth or by varying the signal duration enables additional signals to be used within the bounds of the specific time-frequency region.

In order to determine the total number of signals that may be used in a time-frequency region, it is desirable to determine a measure of the mutual interference or cross-talk between linear FM signals of differing FM slopes. Reference is made to a text entitled "Radar Signals: An Introduction to Theory and Application," authored by C. E. Cook and M. Bernfeld, Academic Press, New York, 1967, Chapter 6. The amplitude response of a linear delay filter matched to a signal with FM slope $\mu_n$, when a difference signal with FM slope $\mu_m$ is introduced into it is:

$$R = (\,|\gamma|\,T_n\;W_n)^{-one\text{-}half}$$

where $$\gamma = \mu_m - \mu_n/\mu_n$$

$\gamma$ is defined as the FM mismatch factor and the peak power response is:

$$R^2 = (\,|\gamma|\;T_n\;W_n)^{-1}$$

The factor $|\gamma|T_n W_n$ can be interpreted as the effective time-bandwidth difference of the two signals. Thus, if the normalized response of the mth signal is to be 20 db below that of the *n*th signal in the *n*th filter, then $|\gamma|T_n W_n = 100$ or for 30 db, then $|\gamma|T_n W_n = 1{,}000$. The factor $R^2$ is then a measure of the mutual interference or cross-talk between linear FM signals of differing FM slopes, and it is seen to be a function of the slope difference $|\gamma|$ and the time-bandwidth product TW.

Table 1 lists time-bandwidth products and FM slope mismatch factors to achieve $R^2 = (100)^{-1}$ and $R^2 = (1{,}000)^{-1}$ for adjacent signals in the table. It will be noted for a signal having a time bandwidth product, TW, of 500 and a mismatch factor, $R^2 = 0.01$, the next highest time bandwidth product which will give a difference of 100 is 600 and since the mismatch factor $|\gamma|$ is determined with reference to the first time bandwidth product, i.e., 500, the mismatch factor, $\gamma$, between the signals having time-bandwidth products of 500 and 600, respectively, is equal to $\Delta TW/TW$.

TABLE I

Time-Bandwidth Products and FM Slope Mismatch Factors for −20 dB and −30 dB Adjacent Signal Cross-Talk

| $R^2$ = .01 (−20 dB Cross-Talk) | | | $R^2$ = .001 (−30 dB Cross-Talk) | |
|---|---|---|---|---|
| γ | TW | Impulse Noise Discrimination,dB* | TW | Impulse Noise Discrimination,dB* |
| .200 | 500 | −27 | 5,000 | −37 |
| .167 | 600 | −27.8 | 6,000 | −37.8 |
| .143 | 700 | −28.5 | 7,000 | −38.5 |
| .125 | 800 | −29 | 8,000 | −39 |
| .111 | 900 | −29.5 | 9,000 | −39.5 |
| .100 | 1,000 | −30 | 10,000 | −40 |
| .0910 | 1,100 | −30.4 | 11,000 | −40.4 |
| .0833 | 1,200 | −30.8 | 12,000 | −40.8 |
| .0770 | 1,300 | −31.1 | 13,000 | −41.1 |
| .0715 | 1,400 | −31.5 | 14,000 | −41.5 |
| .0667 | 1,500 | −31.8 | 15,000 | −41.8 |
| .0625 | 1,600 | −32 | 16,000 | −42 |
| .0588 | 1,700 | −32.3 | 17,000 | −42.3 |
| 0.555 | 1,800 | −32.5 | 18,000 | −42.5 |
| .0527 | 1,900 | −32.8 | 19,000 | −42.8 |
| .0500 | 2,000 | −33 | 20,000 | −43 |

*Assumes impulses of average duration 1/W.

For the first example,$\Delta TW$ is 100 and $TW$ is 500, therefore, the mismatch factor $|\gamma|$ is 0.200. For a time bandwidth product of 600, the mismatch factor with respect to the next signal which has a time bandwidth product of 100 is 100/600 or a mismatch factor $|\gamma| = 0.167$. If two signals having time bandwidth products of, for example, 500 and 800 were used, the mismatch factor $|\gamma|$ would be 300/800 = 0.375 which indicates a larger mismatch factor indicating the cross-talk would be less for signals in Table 1 that were not adjacent.

Another measure of significance is the decorrelation factor for impulse-like noise which, assuming the noise impulses have a bandwidth equivalent to that of the signal, is $1/T_nW_n$ when the RMS noise is taken as a reference.

It can be seen with reference to Table 1 that if the cross-talk parameter is to be −20 dB (i.e., $R^2 = 0.01$), then the group of signals that meet this condition are those that differ in time-bandwidth product by multiples of 100. From this relationship the number of additional signals that may share the same time-bandwidth space can be obtained. Therefore: $N = (TW)_{max} - (TW)_{min}/ |\gamma|\ TW$ which may be rewritten $N=R^2 [(TW)_{max} - (TW)_{min}]$in which $(TW)_{max}$ is the largest time-bandwidth product and $(TW)_{min}$ is the smallest time-bandwidth product.

In order to determine the number N of additional signals that can share the same time-bandwidth space for a −20 dB cross-talk factor equals $R^2 = 0.01$, $(TW)_{max} = 2{,}000$ and $(TW)_{min} = 500$, it follows $N = 0.01\ (2{,}000 - 500) = 15$. Therefore, the total number of signals meeting this cross-talk requirement is $N + 1 = 15 + 1 = 16$.

Figure 4:
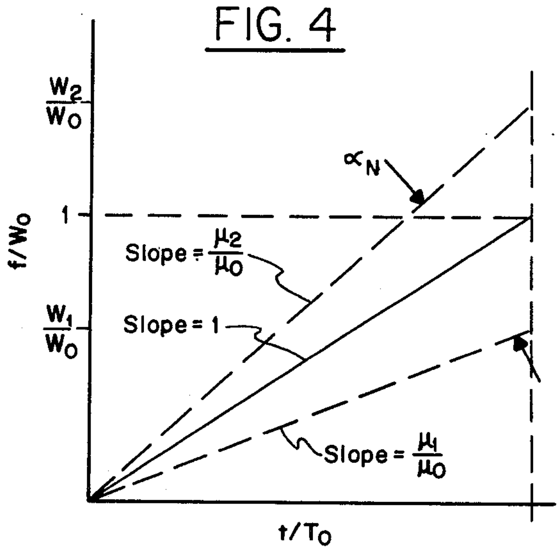
FIG. 4 is a graph of a normalized common time-frequency region bounded by signals having slopes of $\mu_1$ and $\mu_2$.

A more general relationship for the number $N$ of useful signals which may be used in a limited time-bandwidth product region based on the FM slope parameters directly, will now be derived. The FM slope mismatching by varying linear FM bandwidth as shown in FIG. 2 is recast so that the normalized representation shown in FIG. 4 is applicable. The normalization is chosen such that the central FM slope $\mu_o$ is defined by:

$$\mu_2/\mu_o \cdot \mu_1/\mu_o = 1$$

or restated $T_2\ W_2/T_o\ W_o \cdot T_1\ W_1/T_o\ W_o = 1$,
where $T_oW_o$ is the mean time-bandwidth product.

The angle $\alpha_N$ between the bounds provided by $\mu_2$ and $\mu_1$ is defined by:

$$\mathrm{Tan}\ \alpha_N = \frac{\dfrac{(T_oW_2 - T_oW_1)}{T_oW_o}}{1 + \dfrac{T_o^2W_1W_2}{T_o^2W_o^2}}$$

Using the same relationships, this expression simplifies to:

$$\mathrm{Tan}\alpha_N = (T_oW_2 - T_oW_1)/2T_oW_0$$

For this case $T_oW_2$ is equal to $(TW)_{max}$ and $T_oW_1$ is equal to $(TW)_{min}$, so that substituting this result for the expression above given for $N$ yields:

$$N = 2R^2T_oW_2\ \tan\alpha_N$$

Therefore, for a desired number of useful FM signals, a specific cross-talk parameter $R^2$ and a particular value of $T_oW_o$ chosen on the basis of impulse noise discrimination, then the value of $\tan\alpha_N$ defines the minimum and maximum FM slopes that will meet the established conditions. Conceivably, $T_oW_o$ may be limited by hardware considerations and the realistic tradeoff is between N, the number of additional signals, and $R^2$, the cross-talk measure.

The expression for the number of signals N derived above was for FM slopes having the same sign. Allowing the slope signs to be either positive or negative, the total number of signals meeting the cross-talk requirement becomes:

$$M_{total} = 2(2R^2\ T_oW_o\ \mathrm{Tan}\alpha_N + 1)$$

Figure 5:
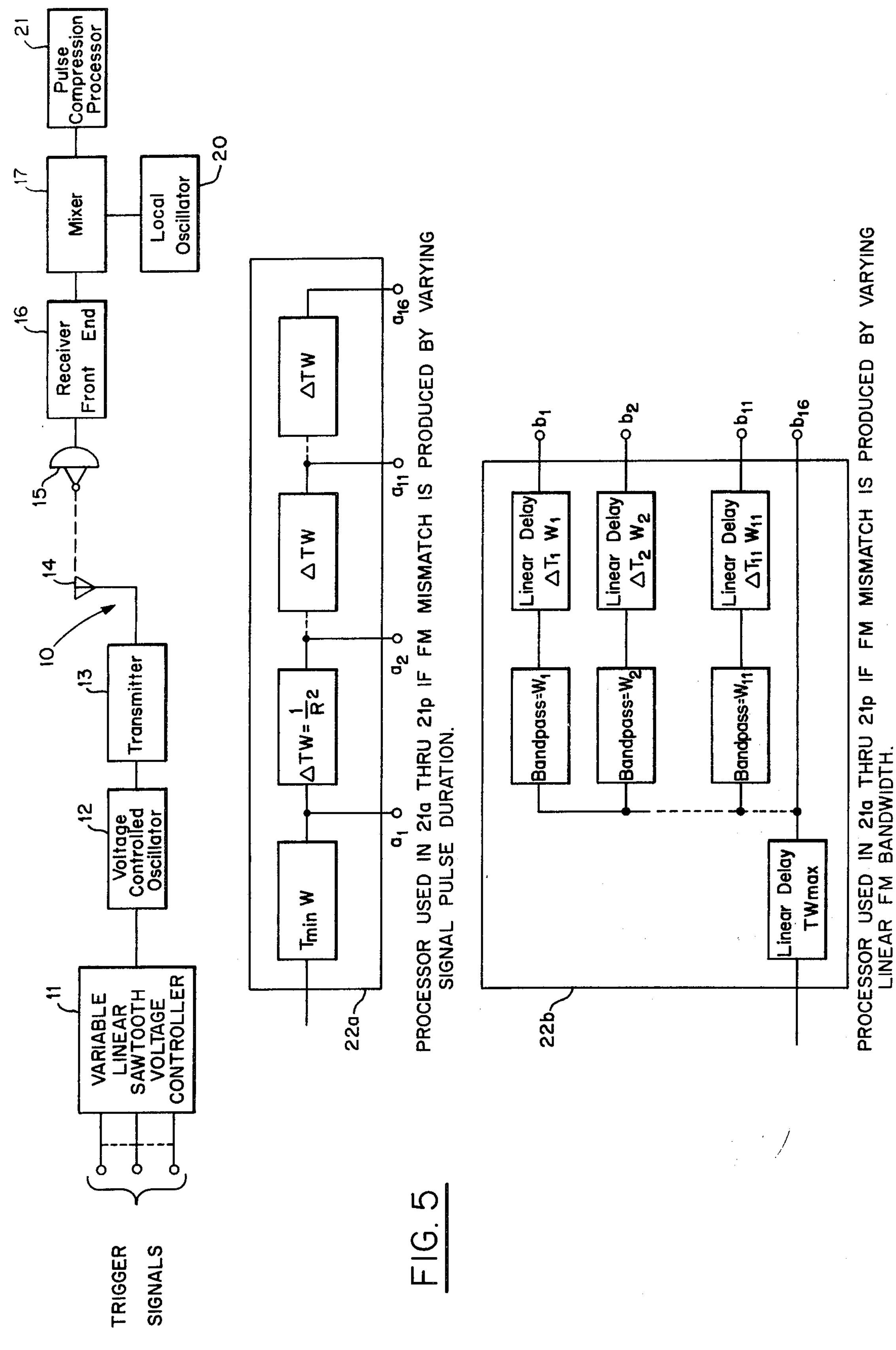
FIG. 5 is a block diagram of a pulse compression communications system incorporating the subject invention.

The system illustrated in FIG. 5 depicts a communication system 10 comprised of a variable linear sawtooth voltage controller 11 which is coupled to a voltage controlled oscillator 12. The combination of the variable linear sawtooth voltage controller 11 and the voltage controlled oscillator 12 comprise a linear FM signal generator capable of generating linear FM signals of different time-bandwidth products; for example signals that have $TW = 500 \ldots TW = 1{,}200 \ldots TW = 2{,}000$ as shown in Table I, and for which it is desired to carefully control the differential time-bandwidth products of the signals in the set. The variable linear sawtooth voltage controller 11, in response to one of the external triggers, generates a control signal for one of the desired linear FM signals which may be, for example, one of a preprogrammed set of sawtooth video signals. Alternatively, the linear FM signal generator may be a digital signal generator which may be programmed to achieve each of the desired linear FM signals with great accuracy. A generator of this type is disclosed in copending U.S. patent application, Ser. No. 1,090, entitled "A Digital Waveform Generator" filed Jan. 7, 1970 in the names of A. W. Crooke and M. E. Hanna, Jr. and assigned to the same assignee as the subject application. Further, the linear FM signals may also be generated by a plurality of linear sawtooth voltage controllers 11 which are individually coupled to an associated voltage controlled oscillator 12.

In the system 10 of FIG. 5 only one signal of the total set available is transmitted at a time. The output signal from the voltage controlled oscillator 12 is applied to a transmitter 13 and coupled to a transmitting antenna 14. A receiving antenna 15 responsive to the transmitted signal from the transmitting antenna 14 is coupled to a receiver amplifier 16 which is in turn coupled to a mixer 17 which has an associated local oscillator 20 coupled thereto. The output of the mixer 17 is coupled to a pulse compression processor 21. The pulse compression processor 21 may be of the type shown as 22*a* or 22*b* in FIG. 5 as determined by the type of FM slope mismatching produced by the linear sweep generator 11. If the FM slope mismatching is produced by varying the linear FM bandwidths, then the processor 22*b* is used. Alternatively, if the linear sweep generator 11 provides FM slope mismatching by varying signal duration, the processor 22*a* is used. A combination of processors 22*a* and 22*b* may be used if both the linear FM bandwidth and pulse duration are varied to control the FM slope mismatching.

In operation, a trigger signal is applied to one of the inputs to the variable linear sawtooth voltage controller 11 in the transmitting section of the system 10. The choice of the specific trigger input designates which of the possible signals having time-bandwidth products $TW = 500 \ldots TW = 1{,}200 \ldots TW = 2{,}000$ is to be generated. Specifically, the designated trigger input actuates one of the set of video sawtooth signals that is produced at the output of the linear sawtooth voltage controller 11 to be applied to the voltage controlled oscillator 12 whereby the frequency versus time output of the voltage controlled oscillator 12 is controlled by substantially only the linear sawtooth signal produced by the variable linear sawtooth voltage controller 11. Each linear FM signal as it is produced by the voltage controlled oscillator 12 is coupled through transmitter 13, where it is heterodyned to a frequency suitable for transmission, and radiated by the antenna 14. The receiving antenna 15 is responsive to the transmitted signals and couples them through the receiver front end 16 to the mixer 17. The received signal is then heterodyned with the signal produced by the local oscillator 20 to obtain replicas of the linear FM signals provided by the output voltage controlled oscillator 12. These signals are then applied to pulse compression processor 21 in which either processor 22*a* or 22*b* is used, depending on the technique used in the linear sawtooth voltage controller 11 to produce the linear FM slope mismatch.

The matched linear FM signal will appear fully correlated at the appropriate output tap of processor 22a or 22b, whereas the same signal will appear at the other output taps of the processor 22a or 22b as a low level time dispersed signal. Thus for the system 10 shown in FIG. 5 the appearance of a signal at a particular output tap will identify the transmitted time-bandwidth product, which is associated with a particular message function.

If linear FM slope mismatch is produced by varying signal pulse duration, processor 22a is used in pulse compression processor 21. The compressed pulse produced at the first terminal $a_1$ of the processor 22a corresponds to the lowest time-bandwidth linear FM signal produced by the voltage controlled oscillator 12. Successive terminals $a_2$ through $a_{16}$ will provide compressed pulse signals in accordance with the corresponding larger time-bandwidth FM signals provided by the voltage controlled oscillator 12.

Alternatively, if processor 22b is used in the pulse compression filter 21a, compressed pulse signal will be provided at terminal $b_1$ which corresponds to the lowest time-bandwidth linear FM signal provided by the voltage controlled oscillator 12. Further, compressed pulse signals provided at terminals $b_2$ through $b_{16}$ will correspond to the corresponding larger time-bandwidth linear FM signals produced by the voltage controlled oscillator 12.

The number of signals that may be used within the time bandwidth region represented by the time-bandwidth products 500 through 2,000 in the communication system 10 shown in FIG. 5 may be doubled by using the same linear FM signal generator that provides the time bandwidth products 500 through 2,000, but utlizing a second mixer and an associated local oscillator added in parallel with the mixer 17 and local oscillator 20 shown in FIG. 5 that inverts the sign of the FM slope. This is a well-known technique for reversing the direction of the frequency progression in a linear FM signal and is described on pages 148 and 149 of the aforementioned text by Messrs. Cook and Bernfeld.

Since the linear FM signals remain very well-correlated over a range of doppler shifts up to a significant fraction of the signal bandwidth, it may be preferable to utilize linear FM signals in a non-synchronous mode where a system is not capable of tracking variations in carrier frequencies due to the effects of doppler shift on the signals. However, there are many applications in which frequency shift effects are either negligible or else can be tracked with adequate accuracy. In these cases, synchronizing techniques can be used to expand the number of signals that may be transmitted within a given time-frequency region. One method which may be utilized for linear FM signals in a synchronized mode is to place the correlated signal in one time slot of a relatively large number of time slots positioned with reference to the time of occurrence of the synchronizing signal. This may be accomplished directly for linear FM signals by shifting the carrier frequency of the desired time slot signal.

Figure 6A:
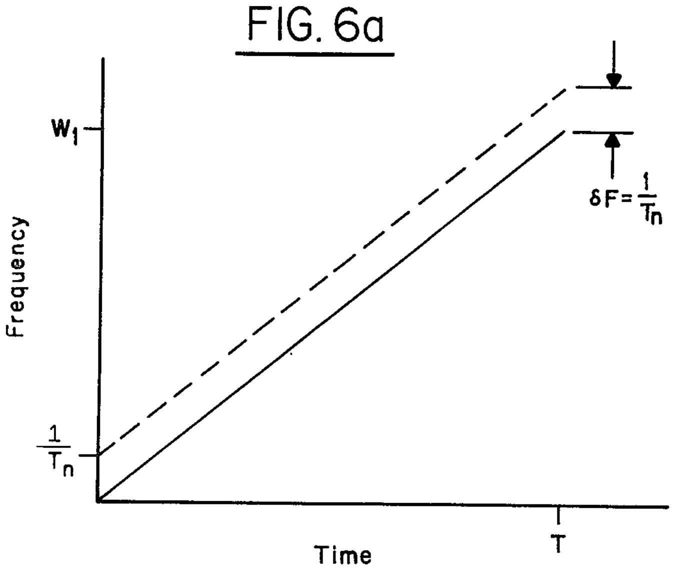
FIGS. 6a and 6b are graphs which illustrate the effect of frequency shift on the time slot location of output signals.
Figure 6B:
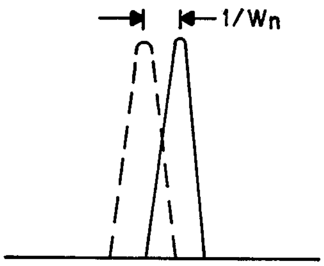

In this technique the transmitted linear FM signal is given a frequency shift $\delta F = \pm 1/T_n$ in which $T_n$ is the signal duration before processing. This frequency shift will produce a time shift of $\pm 1/W_n$ as shown in FIG. 6.

There is an associated loss of the peak signal amplitude as given by:

$$A = A_o\,(1 - |m|\,\delta F/W_n)$$
$$= A_o\,(1 - |m|/T_n W_n)$$

where $m$ = an integer number of units of $\delta F$. An acceptable bound on this loss of amplitude may be taken as about 3 dB. An alternate appraoch would be to allow a wider processor bandwidth for the pulse compression operation and subsequently narrowing the bandwidth after detection to the signal bandwidth. This approach would result in a moderate uniform loss over the range of frequency shifts rather than a 3 dB variation. When 3 dB is taken as an acceptable bound, $m = \pm 0.25 T_n W_n$. Using this technique, it can reasonably be expected to locate a pulse in one of $T_n W_n/2$ time slots for each signal thereby increasing the number of signals which may be transmitted within a given time-frequency region. Assuming both positive and negative FM slopes and the notation derived above for the non-synchronous mode, the total number of signals which may be transmitted in the synchronized mode is:

$$M_{total}\big|_{synch} = T_o W_o + 2R^2 T_o^2\, W \tan\alpha_M$$

Figure 7:
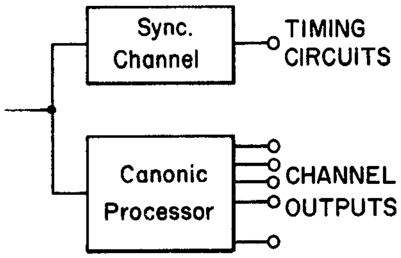
FIG. 7 is a block diagram of a basic form of receiver in a pulse compression communications system embodying the subject invention with synchronization.
Figure 8:
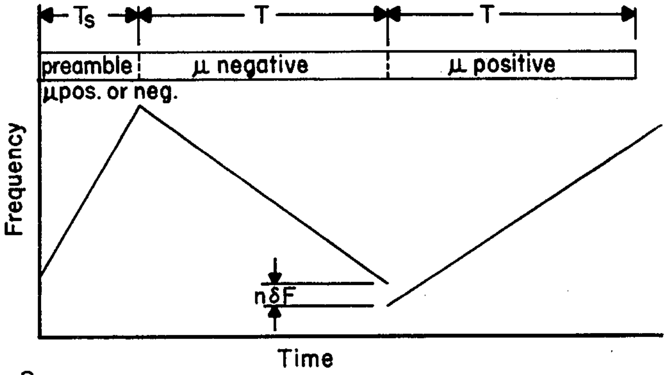
FIG. 8 is a graph of a plurality of signals having different slopes including a preamble signal for synchronization.
Figure 9:
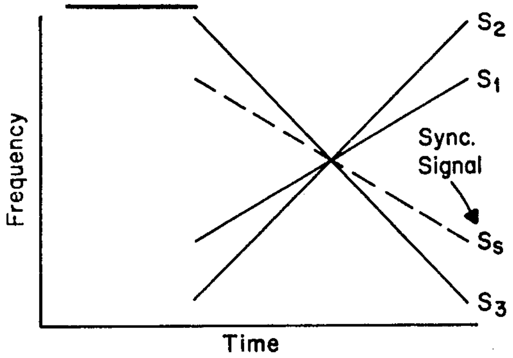
FIG. 9 is a graph of a set of signals having different slopes within a bounded time-frequency region in which one of the set of signals is used to provide synchronization.

A preferred technique for utilizing a synchronizing signal is shown in FIG. 7 in which the processor 22 used in the pulse compression filter 21 is comprised of two separate sections. The first section is synchronizing channel and the second is one of the two processors shown in FIG. 5 and designated 22a and 22b. In this configuration, a low energy TW linear FM preamble signal would be used as the synchronizing signal as shown by the waveform A, shown in FIG. 8 and designated $T_s$. The synchronizing channel, responsive to the low energy TW linear FM preamble signal, would provide a compressed pulse output signal which preceded the compressed pulse data or message signal. An assumption is made that the system signal-noise ratio ($S/N$) is such that the lower energy content of the low energy TW preamble signal would not degrade to any large degree the accuracy of locating the processed synchronizing signal. An alternative approach would be to use one of a set of $M_{total}$ linear FM signals within the total number of signals in the bounded time-frequency region as shown in FIG. 9 and designated $S_S$.

In using a synchronizing signal, the receiver would be in a hunting mode until the synchronizing signal was received and processed. Then, using this as an initial reference, the subsequent received data or message signals would be processed. The communication system 10, shown in FIG. 5, could be readily adapted for synchronized operation by using one of the total of 16 linear FM outputs of the voltage controlled oscillator 12 as the synchronizing signal. For example, the lowest time-bandwidth linear FM signal could be regarded as the synchronizing signal and the output taken from the output terminal $a_1$ on the processor 22a or the output terminal $b_1$ on the processor 22b used for initiation of the timing circuits in the rest of the system. Further, by using positive and negative linear sweep generators one linear sweep generator providing a lower energy output of either a positive or negative slope could be utilized to provide the synchronization signal. The output then taken from the corresponding processor would be coupled to the timing circuits to synchronize the processing in the communication system 10.

Figure 10:
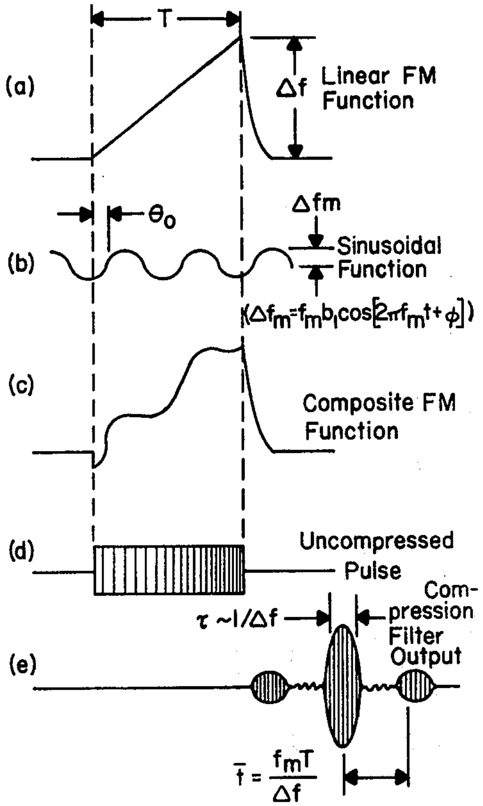
FIG. 10 is a plurality of waveforms which illustrate the effects of sinusoidal phase modulation on a linear FM signal.
Figure 11:
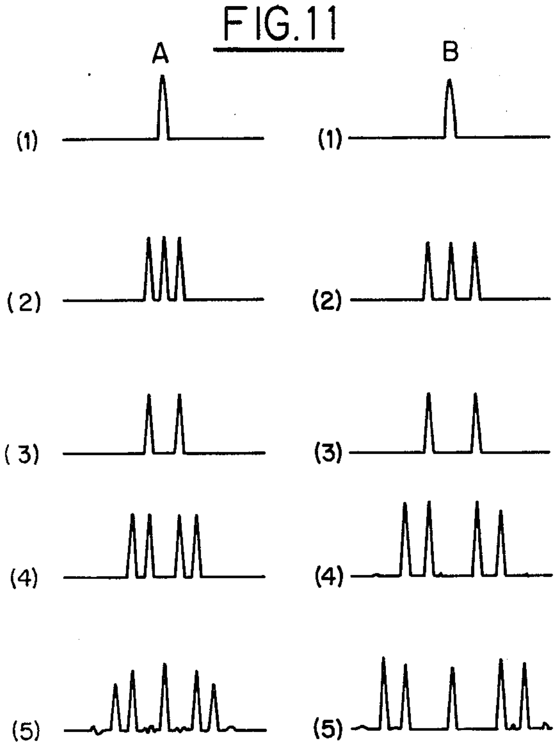
FIG. 11 is a series of waveforms produced by a communications system which employs linear FM synchronized signals with sinusoidal phase modulation under various operating conditions.

The use of a low energy TW linear FM preamble signal as the synchronizing signal is preferable when it is desired to provide an even greater number of signals within a limited time-frequency region by employing complex FM signals. In applicant's U.S. Pat. No. 3,654,544, entitled "Secure Pulse Compression" issued Apr. 4, 1972 and assigned to the same assignee as the subject application, a pulse compression system utilizing complex FM Signals is disclosed. In this patent applicant described an additional sinusoidal FM modulation which was added to the linear FM modulation to produce paired sideband signals that provided well-correlated signals at the output of the pulse compression filter. The effect of the additional sinusoidal modulation on the linear FM modulation is shown in FIG. 10. Further, because of the frequency shift associated with each sideband signal, the processed signals are time displaced about the central position. By increasing the amplitude of the sinusoidal modulation, the amplitudes of the sideband groups are increased as shown in FIG. 11. Further, by increasing the frequency of the sinusoidal FM modulation, the spacing between the sideband pulses is increased.

If the sinusoidal modulating signal is described by $$S_m(t) = s(t) \cos [jb_1 \sin 2\pi f_m t]$$

where $$s(t) = S_n(t)$$

$b_1$ = peak phase modulation $f_m$ = sinusoidal modulation frequency.

Then the processed output is given by:

$$s_0(t) = J_0(b_1)\overline{s_1(t)} \cos \omega_0 t + \Sigma J_n(b_1)\left\{ s_1\left(t+\frac{nf_m}{W}t\right) \cos\left[\left(\omega_0+\frac{nf_m}{2}\right)t\right] + (-1)^n \overline{s_1\left(t-\frac{nf_m}{W}T\right)} \cos\left[\left(\omega_0-\frac{nf_m}{2}\right)t\right]\right\}$$

where $\overline{s_1(t)}$ is the linear FM processed output and $J_n(b_1)$ are the Bessel functions of the first kind, $n$th order.

The above expression for $s_0(t)$ indicates that there is a centrally positoned signal flanked by symmetrically and evenly spaced pairs of signals having amplitudes governed by the respective Bessel function $J_n(b_1)$. A time separation factor may be defined as:

$$\bar{t} = f_m/W\,T$$

Since $(1/W) = \tau$, the compressed-pulse width, this spacing factor in terms of the compressed pulse width is:

$$t \cong (f_m T)\,\tau$$

where $f_m T$ represents the number of modulation cycles over the interval $T$. Therefore, the spacing between the paired signals, expressed in normalized compressed pulse width units, depends only the number of cycles of error modulation that occur in the time duration, T. For example, if there are three modulation cycles in the time T, then the first set of paired signals observed at the output of the pulse compression filter will be located three pulse widths on each side of the $J_0$ term signal.

Ordinarily, it is not considered desirable to have an excessive amount of other modulation added to the linear FM function. The objective in this application is to make the amplitude of the sinusoidal frequency modulation and thus the phase modulation factor $b_1$ sufficiently high so that the sideband output pulse signals are large enough to be detected. With proper choice of $b_1$, the $J_0$ or higher order terms may be nulled. Further, by variation of $f_m$, the time spacings of the respective compressed pulses can therefore be varied. The achievable responses are shown in the order of progressively larger values of $b_1$ in FIG. 11. Using this method to control the number of pulses and their spacing, a typical communication message might be produced by selecting the first configuration from Column A and the second configuration from Column B of the achievable responses shown in FIG. 11.

The principal advantage of this technique is that the same dispersive filter can handle all of the signals that are generated for each channel. A close estimate of the number of different pulse groups that can be constructed by applying this method by allowing a spread of about 30 time slots is approximately 80 pulse groups. Using this number as an additional multiplication factor to the expression obtained for the synchronous mode of operation:

$$80 \cdot (M_{total}|_{synch} = T_o W_o + 2R^2 T_o^2 W \tan \alpha_n)$$

would lead to a very large number for the total number of different signals (or bits of information) that can be provided in the limited time-frequency region. This method can be further extended to allow for interlacing of the pulse groups in Column A and Column B.

Figure 12:
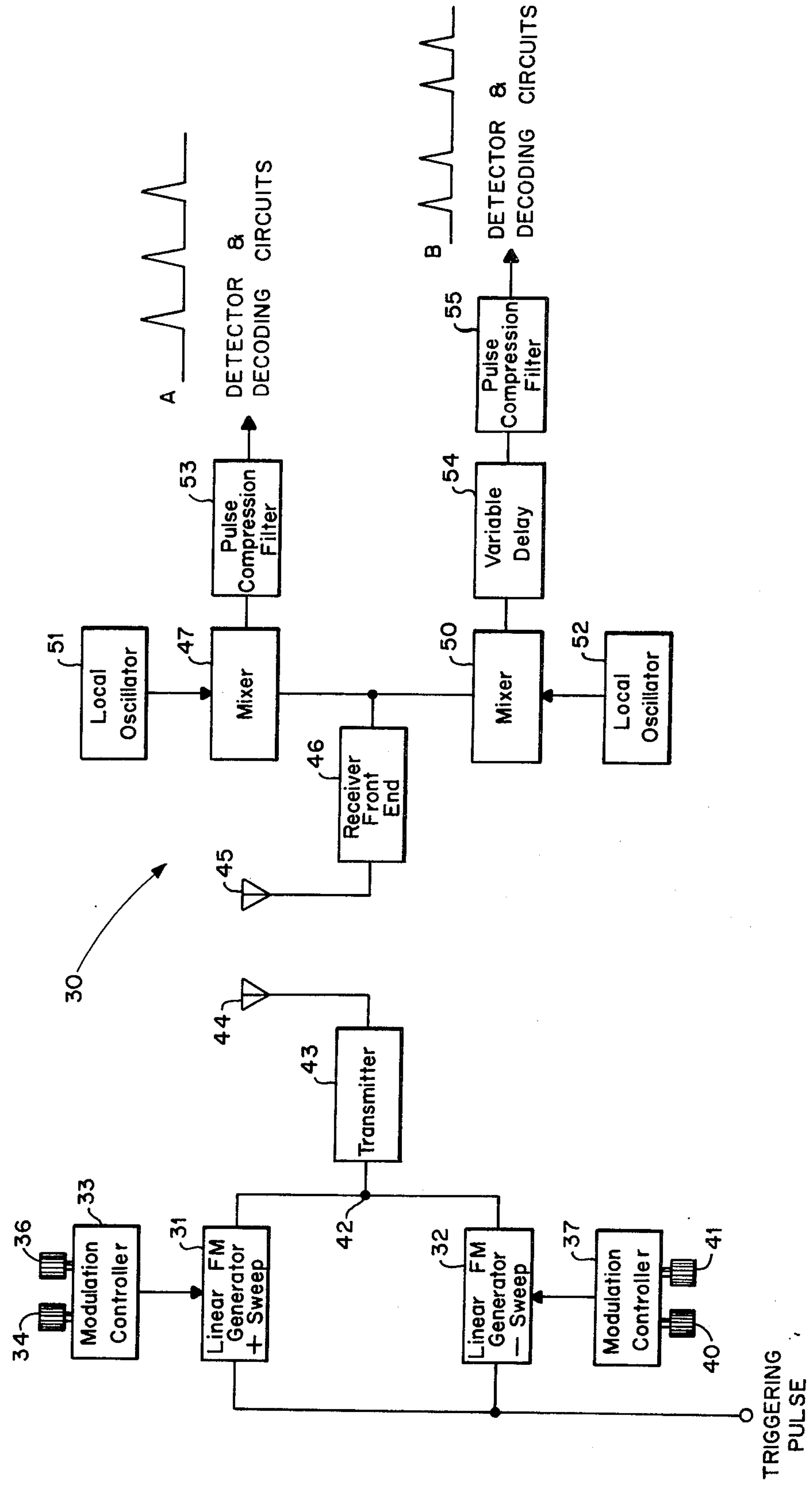
FIG. 12 is a block diagram of a system in which linear FM signals within a bounded time-frequency region are sinusoidally phase modulated to provide a number of output pulse groups within the time-frequency region.

A typical communication system 30 for implementing this increased signalling capability with complex FM signals in the synchronized mode is shown in FIG. 12. A first message from column A comprised of the second pulse group could be transmitted on a positive slope FM signal while a second message from the fourth pulse group in Column B could be transmitted on an orthogonal negative slope FM signal. In the communication system 30 shown in FIG. 12, a trigger pulse is applied to a positive sweep linear FM generator 31 and a negative sweep linear FM generator 32. Coupled to the generator 31 is a modulation controller 33 which has an amplitude control 34 and a frequency control 36. A second modulation controller 37 is coupled to the generator 32 and has an amplitude control 40 and a frequency control 41. The output terminals of the generators 31 and 32 are connected together at a common junction 42 which is also connected to a transmitter 43. The transmitter output terminal is coupled to a radiating antenna 45 which transmits the modulated signals generated from the generators 31 and 32.

A receiving antenna 45 is responsive to the transmitted pulse signals and couples them through a receiver front end 46 to parallel connected mixers 47 and 50. A first local oscillator 51 is coupled to the mixer 47 and a second local oscillator 52 is coupled to the mixer 50. The mixer 47 is coupled to the pulse compression filter 53 and the mixer 50 is coupled through a variable delay 54 to a pulse compression filter 55. The pulse compression filters 53 and 55 include processors 22a or 22b as shown in FIG. 5. The output terminals of the pulse compression filters 53 and 55 are coupled to detector and decoding circuits as indicated by the leader in FIG. 12.

In operation, a triggering pulse is simultaneously applied to the sweep generators 31 and 32. In response to the triggering pulse, the positive and negative linear FM sweep generators 31 and 32 provide positive and negative linear sawtooth waveforms which are modulated by sinusoidal frequency modulation signals provided from modulation controllers 33 and 37, respectively. The amplitude and frequency of the sinusoidal modulation provided by controller 33 is adjusted by using controls 34 and 36 whereas the amplitude and frequency of the sinusoidal modulation provided by controller 37 is adjusted by using controls 40 and 41. The sinusoidally modulated linear positive and negative sawtooth signals provided by the generators 31 and 32 are coupled through the transmitter 43 to the radiating antenna 44. The receiving antenna 45 is responsive to the radiated pulse signals and couples them through the receiver front end 46 to the mixers 47 and 50. Local oscillators 51 and 52 provide frequency signals for converting the frequencies of the received pulse signals to values at which the pulse compression filters 53 and 55 may be conveniently designed. One of the mixers is adapted to invert the sweep sense of the received signals which are applied to it. The inversion of the sense of the frequency sweeping may be accomplished by setting the frequency of the local oscillator 52, for example, above the band of frequencies in which the positive and negative swept signals lie and by selecting the lower sideband which is produced as a result of the heterodyning action with the mixer 50. The sense of the frequency sweeping of the received signal may be preserved by using a local oscillator frequency lower than the band of received frequencies and/or by utilizing the higher sideband produced by the mixer. This technique is disclosed in greater detail in a U.S. Pat. No. 3,400,396 entitled "Pulse Stretching and Compression Radar System" issued Sept. 3, 1968 in the names of Charles E. Cook and Charles E. Brockner and assigned to the same assignee as the subject application.

The pulse compression filter 53 produces a waveform output as represented by waveform A in FIG. 12, which is similar to the second pulse group in Column A of FIG. 11. The pulse compression filter 55 produces the waveform output designated B in FIG. 12 which is similar to the pulse group 4 in column B of FIG. 11. These waveforms A, B may be observed sequentially at the outputs of the pulse compression filters 53 and 55, respectively, or they may be interlaced by means of the variable delay 54. This latter approach is another means of increasing the total number of possible messages by adjusting the interlace positions by means of the variable delay 54 and controlling the center frequencies of the positive and negative FM segments of the over-all signal by means of the linear FM generators 31 and 32. Since the amplitude of the individual pulses falls off as the number of pulses in the group increases, the signal design parameters for a given system would have to take this into account by making the over-all waveform energy content provide adequate detectability for the group of signals with the largest number of paired sideband pulses.

In the type of communication system 30 shown in FIG. 12 the different FM slopes may convey message information, or the FM slopes may be used as a method of addressing a particular receiver or group of receivers whose pulse compression processor is matched only to one particular FM slope rather than to the entire set of FM slopes as shown in the processors **22*a* and 22*b* in FIG. 5. If the FM slope is used as a means of addressing a group of users and a synchronizing signal is also employed, then a particular set of contiguous time slot intervals can designate the sub-address of a particular receiver in the group. The particular set of contiguous time slots can be achieved by the aforementioned method of frequency shifting the transmitted linear FM center frequency. Within this set of contiguous time slots the variety of pulse groups as shown in column A and column B of FIG. 11** will then comprise the basis for the messages that can be sent to that receiver.

While the invention has been described in its preferred embodiments, it is to be understood that the words which have been used are words of description rather than limitation and that changes may be made within the purview of the appended claims without departing from the true scope and spirit of the invention in its broader aspects.

I claim:

1. A pulse compression communications system including a transmitter and a receiver; said transmitter comprising, a source of triggering pulses, a source of a plurality of frequency swept carrier oscillations providing a plurality of non-synchronous signals within a limited time-frequency region each signal having a different time versus frequency slope characteristic which satisfies a specific cross-talk requirement between signals having adjacent values of time-bandwidth product, means for transmitting said plurality of non-synchronous frequency swept carrier signals;

said receiver comprising, means for receiving said transmitted plurality of non-synchronous frequency swept carrier signals, and pulse compression filter means including a processor for providing a plurality of output pulses; each output pulse corresponding to a selected one of said plurality of transmitted non-synchronous frequency swept signals.

2. A pulse compression communications system as described in claim 1 in which said source of a plurality of frequency swept carrier oscillations includes means for providing signals having the same pulse duration and different bandwidths.

3. A pulse compression communications system as described in claim 1 in which said source of a plurality of frequency swept carrier signals includes means for providing signals having the same bandwidth and different pulse durations.

4. A pulse compression communications system as described in claim 1 in which said source of a plurality of frequency swept carrier oscillations includes means for providing a plurality of synchronous signals, and said processor for providing a plurality of output pulses includes a processor for providing synchronizing pulse signals.

5. A pulse compression communications system as described in claim 4 in which said means for providing synchronous signals includes a source of frequency swept carrier oscillations for providing a low energy frequency modulated preamble signal as the synchronizing signal and said processor for providing synchronizing signals includes means which provides a low energy synchronizing preamble pulse signal.

6. A pulse compression communications system including a transmitter and a receiver; said transmitter comprising, a source of triggering pulses, a plurality of sources of frequency swept carrier oscillations providing a plurality of synchronous signals within a limited time-frequency region each signal having a different time versus frequency slope characteristic which satisfies a specific cross-talk requirement between signals having adjacent values of time-bandwidth product, a plurality of sinusoidal modulating signals, a plurality of means for angle modulating said frequency swept carrier oscillations with said sinusoidal modulating signals, each of said means coupled to a corresponding one of said plurality of sources of frequency swept carrier oscillation and a corresponding one of said sources of sinusoidal modulating signals, means for simultaneously transmitting said angle modulated carrier oscillations;

said receiver comprising means for receiving the transmitted carrier oscillations, and pulse compression filter means including a plurality of processors for providing a plurality of output pulse groups; each output pulse group corresponding to a selected one of said plurality of angle modulated signals.

7. A pulse compression communications system as described in claim 6 in which said receiver further includes delay means for interlacing said plurality of output pulse groups.

8. A pulse communications system as described in claim 6 which further includes a plurality of second sources of frequency swept carrier oscillations in which the sense of the carrier frequency sweep of said second sources is opposite to the sense of the carrier frequency sweep of said first sources of frequency swept carrier oscillations;

said receiver further includes means for inverting the frequency sweep sense of both received carrier oscillations, and second pulse compression means including a plurality of second processors for providing a plurality of output pulse groups, the receiver carrier oscillations being applied to the first pulse compression means and the sense-inverted carrier oscillations being applied said second pulse compression filter means.

9. A pulse compression communications system as described in claim 1 in which said source of a plurality of frequency swept carrier oscillations includes first means for providing signals having the same pulse duration and different bandwidths and second means for providing signals having the same bandwidth and different pulse durations.

10. A pulse compression communications system as described in claim 1 in which said source of a plurality of frequency swept carrier oscillations includes means for providing signals having the same center frequency with different frequency bandwidths.

11. A pulse compression communications system as described in claim 1 in which said source of a plurality of frequency swept carrier oscillations includes means for providing signals having different center frequencies and the same frequency bandwidths.

* * * * *